United States Patent
Sair

[15] 3,647,487
[45] Mar. 7, 1972

[54] TWO-STEP METHOD FOR PRODUCING STERILIZED GROUND SPICES

[72] Inventor: Louis Sair, Evergreen Park, Ill.
[73] Assignee: The Griffith Laboratories, Inc., Chicago, Ill.
[22] Filed: Aug. 5, 1968
[21] Appl. No.: 749,997

[52] U.S. Cl.............................99/225, 21/DIG. 4, 99/140 R, 99/213
[51] Int. Cl. .........................................................A23l 3/34
[58] Field of Search....................21/58, DIG. 4; 99/140, 225, 99/213; 21/58 AO

[56] References Cited

UNITED STATES PATENTS 2,229,360   1/1941   Baer................................21/A.O.
3,206,275   9/1965   Sair.................................21/58

*Primary Examiner*—Morris O. Wolk
*Assistant Examiner*—Sidney Marantz
*Attorney*—Merriam, Marshall, Shapiro & Klose

[57] ABSTRACT

Spices are effectively sterilized without the formation of untoward quantities of ethylene chlorohydrin by subjecting whole, unground spices to an atmosphere of ethylene oxide, which is effective to substantially kill the bacteria on the surface of the spices, grinding the thus treated spices, and finally subjecting the ground spices to an atmosphere of propylene oxide which is effective to substantially kill the remaining bacteria or any bacteria picked up during the grinding step.

6 Claims, No Drawings

TWO-STEP METHOD FOR PRODUCING STERILIZED GROUND SPICES

This invention relates to a method of purifying spices, and more particularly to a two-step method of purifying spices. This invention is based on the discovery that spices can be effectively sterilized without the formation of untoward quantities of ethylene chlorohydrin, by subjecting whole, unground spices to an atmosphere of ethylene oxide, which is effective to substantially kill the bacteria on the surface of the spice, grinding the thus treated spices, and finally subjecting the ground spice to a sterilization treatment using propylene oxide, in order to complete the bacteria kill or to kill off bacteria which were picked up in the grinding step.

Purification or sterilization of spices and food materials in general by using ethylene oxide or propylene oxide is described in the prior art, including such patents as U.S. Pat. Nos. 2,189,948, 2,189,949, and more recently in U.S. Pat. No. 3,206,275. It has been found that ethylene oxide or propylene oxide, when applied either under vacuum or under pressure, either with or without an inert gas diluent, can effectively destroy bacteria, yeast, mold, and other pathogens without the need for high temperatures. Ethylene oxide, in particular, has been widely applied in the sterilization of many food materials including spices, gums, starch, flour, yeast and milk.

As directed by recent legislation, the Food and Drug Administration has reevaluated its approval of the use of ethylene oxide as a fumigant or sterilizing agent for food materials. Recent attempts to have the usage of ethylene oxide approved by the Food and Drug Administration on the basis that it is "generally recognized as safe," has been met with negative responses. According to the new law, the Food and Drug Administration now insists on proof of safety. More specifically, prior to approving the use of ethylene oxide, the Food and Drug Administration wanted tests conducted in order to determine what compounds may be formed during ethylene oxide sterilizing treatments, and wanted to know generally the physiological effect of any compounds which may have been formed. Such tests would necessarily show what residues are left on the material being sterilized. Earlier evidence (see U.S. Pat. No. 2,667,421) was available that indicated sterilizing treatments using ethylene oxide resulted in the creation of ethylene glycol which in turn was questionable with respect to health. The ethylene oxide sterilizing process thus became "suspect."

At one time the Food and Drug Administration was very concerned about the formation of ethylene glycol, which occurs during the sterilization process using ethylene oxide as the sterilizing agent. Ethylene glycol is toxic and gave cause for concern. However, propylene glycol, which is formed during the analogous sterilizing process using propylene oxide, is considered quite safe. About 3 years ago, research from England showed that in addition to the glycols, chlorohydrins are sometimes formed during sterilizing processes using the alkylene oxides. Ethylene chlorohydrin has been found to be toxic, while propylene chlorohydrin has a much lower toxicity value.

Because of the questioned safeness of ethylene oxide, many other materials, including propylene oxide, were tried, and then tested for effectiveness. The use of propylene oxide is described in U.S. Pat. No. 3,206,275. Tests indicated that propylene oxide forms only the relatively nontoxic propylene glycol as a residue during the sterilization process.

The usage of propylene oxide met with more favorable response from the Food and Drug Administration. In the May 4, 1965 Federal Register, the Food and Drug Administration granted permission to use propylene oxide in the sterilization of nuts, excluding peanuts, cocoa, starch, and ground spices. At about this time, the Food and Drug Administration became aware that chlorohydrin residues were produced during ethylene and propylene oxide sterilization. Studies showed that when a ground spice is treated with ethylene oxide, the quantity of chlorohydrin that is formed in the material can be very substantial. In some ground spices, sterilization with ethylene oxide may form as much as 1,800 parts per million of ethylene chlorohydrin or approximately 0.18 percent. Food having an ethylene chlorohydrin level of 1,000 p.p.m. can be toxic to rats. Obviously, the use of spices in food materials is at a very low level, with a consequent of very low level of ethylene chlorohydrin, but nevertheless, the question of safety is still presented. Extensive feeding studies and bacteriological studies are being undertaken in an effort to determine the affect on humans of ethylene chlorohydrin residues in ground spices. While the toxicity levels and safety levels of ethylene chlorohydrin residues have not yet been determined, it would be obviously advantageous to eliminate or reduce the level of the ethylene chlorohydrin residues insofar as possible.

Toxicity studies have shown that propylene chlorohydrin is considerably less toxic than ethylene chlorohydrin. However, propylene oxide is not as effective as ethylene oxide as a sterilizing agent or fumigant when used on spices. The Food and Drug Administration has permitted the use of propylene oxide as a fumigant or sterilizing media for ground spices, but has not approved the use of ethylene oxide in ground spices. Despite the permission given by the Food and Drug Administration to use propylene oxide, it is not always possible to obtain effective kills using propylene oxide alone. Many segments of the food industry today have set up very strict bacteriological standards which cannot be met by sterilizing ground spices using propylene oxide. Although the Food and Drug Administration continues to refuse to permit the use of ethylene oxide generally, they do permit the use of ethylene oxide to sterilize whole, unground spices.

The present invention is based on the discovery that whole unground spices can be substantially sterilized by a treatment of the whole spice using ethylene oxide. The spices thus sterilized may then be ground and given a final sterilization treatment with propylene oxide. While the propylene oxide is not as effective as the ethylene oxide as a sterilizing agent, it has been found that during the grinding process, the spices do not pick up a great deal of bacteria or other contaminants, and that the final sterilizing step is adequate to give an effective kill. It has been found that this process does not cause the formation of untoward quantities of ethylene chlorohydrin.

It has been discovered that effective bacteria kills on spices can be achieved when ethylene oxide is applied to whole unground spices and that the resulting ethylene chlorohydrin level will be much lower than that resulting from a corresponding sterilization process on ground spice. To demonstrate this, a series of whole spices were treated with ethylene oxide using the standard 0.75 oz. of ethylene oxide per cubic foot in the retort for a period of 4 hours. A duplicate group of spices were then ground and samples were treated in a similar fashion in the retort using ethylene oxide. The samples were then analyzed for ethylene chlorohydrin residues. The results are shown in table I.

TABLE I

Residual Ethylene Chlorohydrins for Sterilized Spices

| | Whole Spice p.p.m. | Ground Spice p.p.m. |
|---|---|---|
| Nutmeg | 70 | 196 |
| Oregano | 450 | 1,000 |
| Celery | 595 | 1,000 |
| Red Pepper | 950 | 1,800 |
| Coriander | 222 | 1,725 |
| Thyme | 403 | 620 |
| Black Pepper | 532 | 1,480 |

In general, the chlorohydrin residue on a spice when treated whole is approximately 50 percent or lower than the ethylene chlorohydrin level when the spice is treated in the ground state. Since ethylene chlorohydrin is known to be quite toxic, this reduction in the level of the ethylene chlorohydrin residue is of great importance because it makes the spice more wholesome for human consumption.

It has been discovered that the bulk of bacteria associated with spices are found on the surface of the whole spice. This discovery is easily demonstrated by the following test:

A series of whole unground spices were treated for 4 hours at 125° F. with 0.75 ounce of ethylene oxide per cubic foot of retort space. The whole spices were then ground under commercial conditions, and the bacteria count taken. The results are shown in table II.

TABLE II

| | Total Bacterial Count/gm. | |
|---|---|---|
| | Before Treatment | After Treatment |
| Whole Black Pepper | 16,000,000 | 500 |
| Whole Fennel Seed | 320,000 | 40 |
| Whole Allspice | 1,600,000 | 1,500 |
| Whole Muntok White Pepper | 193,000 | Less than 100 |

This invention then contemplates treating the ground spice with propylene oxide. Since the bacteria count of the thus ground spice is quite low, it is now possible to get an extremely effective kill using propylene oxide. Through the use of this process, it is possible to achieve the production of purified ground spices having a bacteria count of substantially less than 10,000 per gram and less than 1,000 p.p.m. of ethylene chlorohydrin.

Despite the formation of substantial quantities of ethylene chlorohydrin, as is shown in table I, above, ethylene oxide is known to be an effective sterilizing agent for ground spices. This is demonstrated by the following test:

A series of commercially ground spices were treated using 0.75 ounce of ethylene oxide per cubic foot of retort space for 3 hours. The results are shown in table III.

TABLE III

| | Total Bacteria Count/gm. | |
|---|---|---|
| | Untreated | Treated |
| Ground Celery | 430,000 | 230 |
| Ground Thyme | 320,000 | 200 |
| Ground Rosemary | 380,000 | 30 |
| Ground E.I. Nutmeg | 14,000 | 100 |
| Ground Mace | 13,000 | 290 |

Propylene oxide, when used under typical commercial usage of 2.25 ounces to the cubic foot with treatment for 3 hours, is also very effective and when the incidence of contamination is low, propylene oxide fumigation by itself will give the desired effective kill. However, if the level of contamination is high, for instance, being in excess of 1,000,000 total bacteria per gram, the final count may be higher than desirable. The results of such a propylene oxide treatment are shown in table IV.

TABLE IV

| | Total Bacterial Count/gm. | |
|---|---|---|
| | Untreated | Treated |
| Cinnamon | 70,000 | 200 |
| Coriander | 3,000,000 | 3,400 |
| Fennel | 30,000 | 400 |
| Ground White Pepper | 45,000 | 2,100 |
| Ground Black Pepper | 36,000,000 | 70,000 |

For most spices the propylene oxide treatment is sufficiently effective to meet most specifications. However, in the cases such as the ground black pepper, where the ground spice is left with a total count of 70,000, the resulting spice is not universally acceptable in commerce since many purchasers insist on a total bacterial count of 10,000 or less.

The foregoing tests demonstrate that the quantity of ethylene chlorohydrin formed during the sterilization treatment with ethylene oxide of ground spices may be approximately 1,500 parts per million or more. Using the same quantity of ethylene oxide to treat whole, unground spices, the quantity of ethylene chlorohydrin formed is much lower. For example, it has been generally found that less than about half as much of ethylene chlorohydrin is formed as compared to the amount produced during the sterilization of ground spices. Thus, sterilizing the whole spice rather than the ground spice results in the production of less toxic materials. When operating within the scope of this invention, the ethylene oxide sterilized whole spice is ground, and then treated with propylene oxide. While the treatment with the propylene oxide results in a formation of some propylene chlorohydrin residues, since the propylene chlorohydrin residues are far less toxic than the ethylene chlorohydrin residues, the propylene chlorohydrin does not increase the potential toxicity level of the spices thus treated.

The first step of the process of this invention, namely, the ethylene oxide sterilization of the whole, unground spices, may be carried out under conventional conditions using conventional equipment. For instance, the ethylene oxide concentration may vary from about 0.25 ounce to 1.50 ounces per cubic foot of retort, while the retention time may vary from about 30 minutes to 6 hours or more. Generally speaking, 0.75 ounce of ethylene oxide per cubic foot of retort held for 4 hours has been found to accomplish the requisite sterilization. Ambient temperatures are generally satisfactory, although elevated temperatures may be employed if desired. When pure ethylene oxide is used as the sterilizing agent, it is preferred to use pull or vacuum on the retort before the ethylene oxide is admitted thereto. Thus, the sterilization process may be accomplished at a pressure less than atmospheric. When the ethylene oxide is diluted, for example, with carbon dioxide or with one of the Freons, the sterilization may be advantageously conducted at atmospheric pressure or at superatmospheric pressure. This invention requires only that a fairly effective bacteria kill be accomplished by the ethylene oxide sterilization of the whole spice. The precise conditions under which this is accomplished are not critical.

The next step is to grind the sterilized whole spices. The grinding may immediately follow the first sterilization step or the spices may be first stored and ground later. If the storage conditions are sufficiently clean and sanitary, no further sterilization before grinding should be required. The grinding may be accomplished in any desired manner, but it is preferably accomplished under the most sanitary conditions possible in order to avoid unnecessary bacteria pickup. However, it has been found that, under normal plant conditions, the spices will pick up bacteria during the handling, storage, or grinding. While it is possible, under laboratory conditions, to nearly obviate such bacteria pickup, such precautions or conditions are not practicable in commercial operations.

The final step, the propylene oxide sterilization can be accomplished under a wide variety of conditions. For instance, it has been found that 2.25 ounces of propylene oxide per cubic foot of retort for 3 hours will give a very good bacteria kill on the ground spices, if the bacteria count is not too high to begin with. However, from as little as 1 ounce to about 4 ounces of propylene oxide for from 30 minutes to 6 hours may be successfully used. Likewise, the temperatures and pressures may be varied over wide limits.

The following example will serve to illustrate the process of this invention, but it is understood that the example is set forth merely for illustrative purposes and that many other conditions and apparatus may be used.

EXAMPLE 1

A whole unground black pepper sample having a bacteria count of 18,000,000 per gram, is divided into three portions.

The first portion of the pepper sample is ground under conditions simulating commercial spice grinding, and was then placed in a retort. A vacuum is pulled on the retort and 0.75 ounce of ethylene oxide per cubic foot of retort is admitted to the retort. After 4 hours, a vacuum is again pulled, and then broken with air and the first portion of the sample tested. The first portion of the sample shows a bacteria count of 3,000 per gram and an ethylene chlorohydrin content of 1,520 p.p.m.

The second portion of the sample is similarly ground and sterilized, but using 2.25 ounces of propylene oxide per cubic foot of retort rather than ethylene oxide. The thus treated second portion of the sample contains no ethylene chlorohydrin, but has a bacteria count of 65,000 per gram.

The third portion of the sample is treated in accordance with the present invention. The whole unground pepper is sterilized using ethylene oxide at 0.75 ounce per cubic foot of retort volume for 4 hours. The thus treated pepper has a bacteria count of 2,000 per gram and an ethylene chlorohydrin content of 425 p.p.m. Following a grinding operation under simulated commercial conditions, the bacteria count is 3,500 per gram with the ethylene chlorohydrin unchanged at 425 p.p.m. The ground pepper is sterilized as described above, using 2.25 ounces of propylene oxide per cubic foot of retort for 4 hours. The final testing shows a bacteria count of 500, with the ethylene chlorohydrin still unchanged at 425 p.p.m.

The process of this invention may be applied to any spices which are to be ground. For instance, the present process has been successfully used on allspice, basil, celery, korintji, cinnamon, coriander, ginger, mace, nutmeg, oregano, black pepper, cayenne pepper, white pepper, thyme, turmeric, and the like.

Through the use of the present invention, equally useful results are obtained on the yeast and mold and coliforms, but the figures for total bacteria are presented herewith in order to exemplify the value of the process.

The present invention may be carried out in any of the commercially available retorts using various different methods. For instance, the usual conventional method may be used whereby the open retort is loaded and then sealed. The retort is generally evacuated, preferably to a vacuum of 29 inches of mercury or more, the higher the better, and the sterilizing gas is introduced to the retort. The times and temperatures of the process are generally regulated by the extent and kind of bacteria kill desired. After the required period, the retort is evacuated to remove the sterilizing gas, and the retort is open to the entry of air, or preferably sterilized air, in order to permit opening of the retort and the removal of the load. Alternatively, a pulsating process such as is described in U.S. Pat. No. 3,206,275, may be used. If the sterilizing gas is diluted, the treatment used should be modified to compensate for the dilution.

The forms of the invention herein shown and described are to be considered only as illustrative. It will be apparent to those skilled in the art that numerous modifications may be made therein without departure from the spirit of the invention or the scope of the appended claims.

I claim:

1. A method of producing a sterilized ground spice having a low ethylene chlorohydrin content which comprises subjecting a whole, unground spice to the sterilizing influence of ethylene oxide; grinding said sterilized spice; and subjecting said ground spice to the sterilizing influence of propylene oxide.

2. A method of sterilizing a spice as described in claim 1, wherein about 0.75 ounce of ethylene oxide per cubic foot of volume for from about 3 to about 4 hours is used to sterilize said whole, unground spice.

3. A method of sterilizing a spice as described in claim 1, wherein about 2.25 ounces of propylene oxide per cubic foot of volume for from about 2 to about 5 hours is used to sterilize said ground spice.

4. A method of sterilizing a spice which comprises placing a whole unground spice in a retort means, evacuating air from said retort means in order to achieve a vacuum of at least 20 inches of mercury, introducing ethylene oxide to said retort means at a concentration and for a time sufficient to substantially sterilize said whole spice, removing said spice from said retort means, grinding said spice, placing said ground spice in a second retort means, evacuating said second retort means, introducing propylene oxide to said retort means at a concentration and for a time sufficient to substantially sterilize said ground spice, and removing said ground spice from said retort.

5. A method of sterilizing a spice as described in claim 4, wherein about 0.75 ounce of ethylene oxide per cubic foot of volume for from about 3 to about 4 hours is used to sterilize said whole, unground spice.

6. A method of sterilizing a spice as described in claim 4, wherein about 2.25 ounces of propylene oxide per cubic foot of volume for from about 2 to about 5 hours is used to sterilize said ground spice.

* * * * *